Nov. 10, 1959     R. G. HORROCKS ET AL     2,912,482
AERIAL CABLE SUPPORT AND SPACER
Filed Feb. 12, 1959                                      2 Sheets-Sheet 1
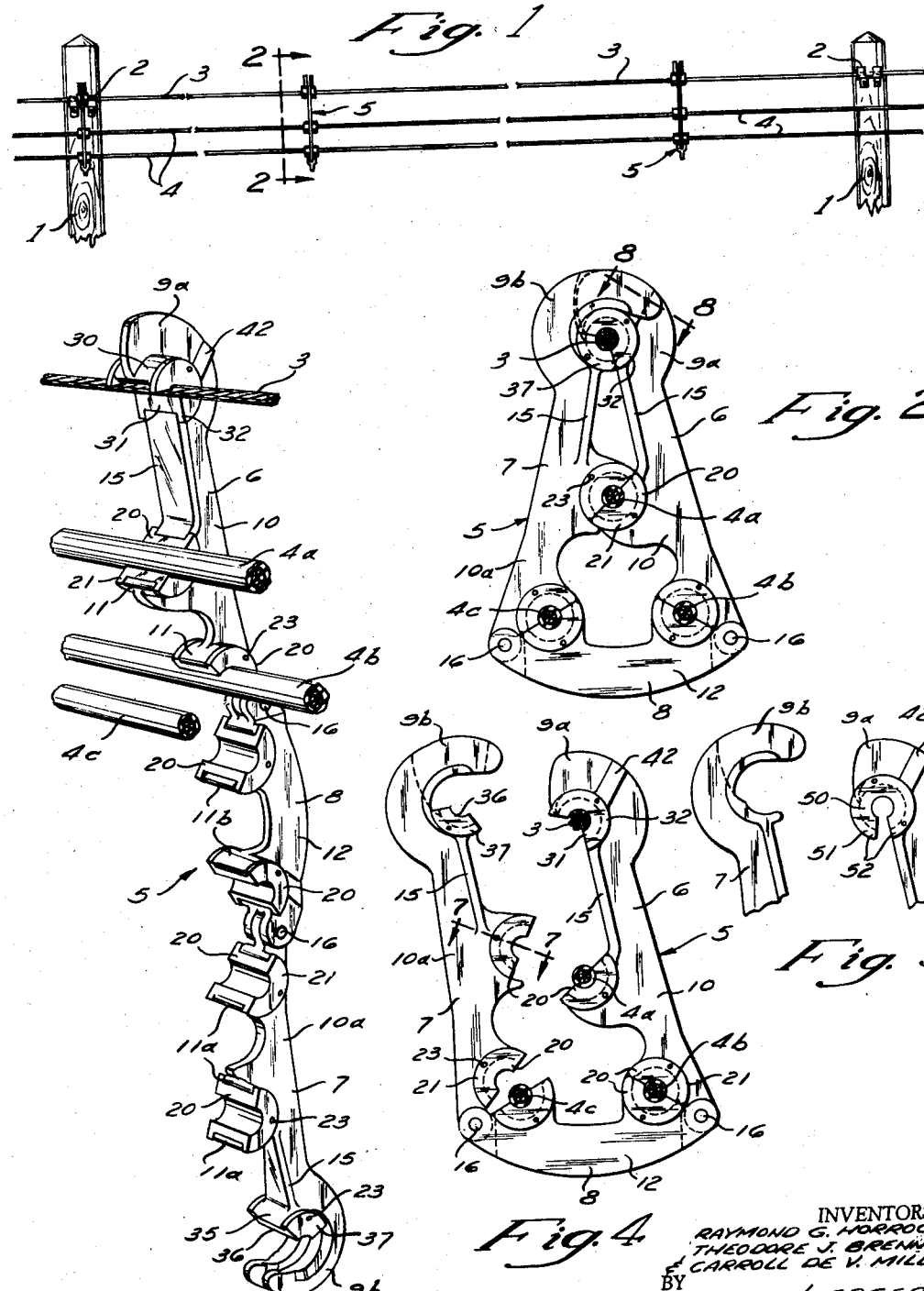
INVENTORS
RAYMOND G. HORROCKS,
THEODORE J. BRENNER,
& CARROLL DE V. MILLER
BY
WATTS & EDGERTON
A.D. Watts
ATTORNEYS

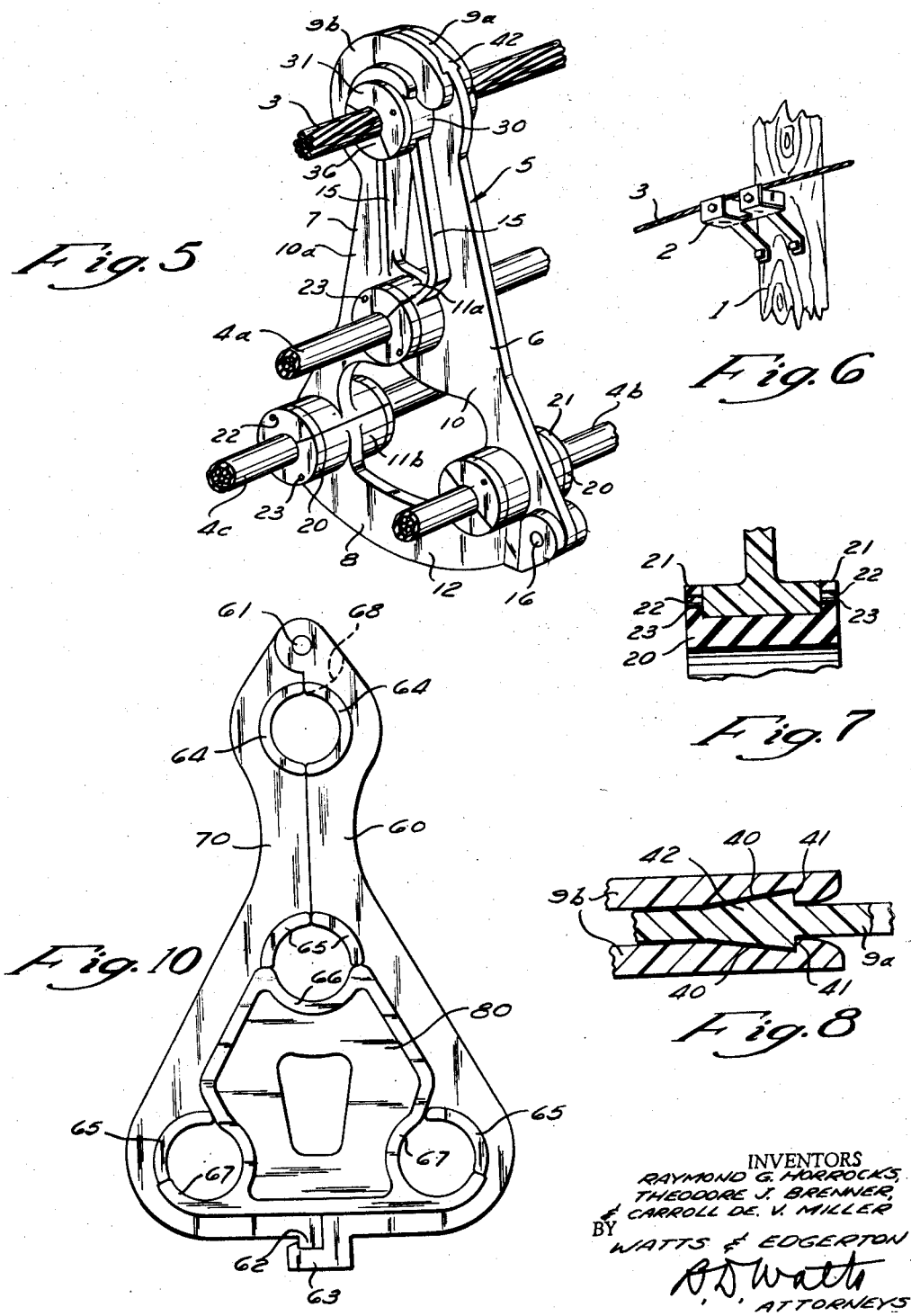

United States Patent Office 2,912,482
Patented Nov. 10, 1959

2,912,482

AERIAL CABLE SUPPORT AND SPACER

Raymond G. Horrocks, Lakewood, and Carroll de V. Miller and Theodore J. Brenner, Rocky River, Ohio, assignors to PLM Products, Inc., Cleveland, Ohio, a corporation of Ohio Application February 12, 1959, Serial No. 792,791

14 Claims. (Cl. 174—146)

This invention relates generally to the art of electrical power transmission, and is more particularly concerned with means for supporting and spacing a plurality of aerial cables.

As is well known in the art, aerial cables are electrical conductors which are covered by insulation which is sufficient to prevent substantial dielectric loss or current leakage. When such an aerial cable is strung from widely separated poles, for example, 300 feet apart more or less, means is required to support the cable. Means commonly used for that purpose heretofore has included a steel cable, commonly called a "messenger," and some kind of supporting means depending from the messenger and supportedly engaging the aerial cable. This supporting means should be made of material which is a relatively poor conductor of electricity. When two or more aerial cables are strung from pole to pole, it is necessary not only to support these cables at spaced places between the poles, but also to space them from one another so as to prevent loss of current by reason of the cables coming close enough to each other for current to escape from one to the other.

Various forms of devices have been proposed for supporting and spacing a plurality of aerial cables but all such devices with which we are familiar have possessed certain outstanding disadvantages. It will be understood that in normal practice, the cable supporting and spacing device is assembled with the messenger and the aerial cables by a worker who is seated on means suspended from the messenger, such as a boatswains chair or standing on a platform mounted on an elevating truck. Those prior devices have included several parts, such as bolts, nuts and the like which had to be disassembled and assembled by the workman when the device was being applied to a messenger and cables. Even in warm weather, it was awkward for him to disassemble and hold these parts while applying other parts to the messenger and cable and then to assemble parts such as bolts and nuts. Not only was this procedure slow and awkward but frequently the workman dropped some of these small parts to the ground and, consequently, had to carry a supply with him or retrieve the dropped parts. In cold weather, when the workman was wearing gloves, the difficulty of assembling the cable supporter and spacer was greatly magnified as was the time required therefor. In short, none of the prior cable supporting and spacing devices, with which we are familiar, could be readily assembled with a messenger and aerial cables without the loosening or removal of any parts.

The present invention aims to provide a device for supporting and spacing aerial cables which can be readily assembled with a messenger and aerial cables, even by workmen standing on the ground and without loosening any parts or disassembly, removal and assembly of any parts. The invention also aims to provide a device of the class described which possesses all the advantages of the best prior devices used for similar purposes while avoiding the disadvantages of those devices.

These aims are attained by the present invention which will be better understood by those skilled in the art from the following specification and the drawings accompanying and forming a part of it.

In the drawings,

Figure 1 is a side elevational view of three devices embodying the present invention each in assembled position with a messenger supported by two poles and a plurality of aerial cables supported and spaced by said device.

Figure 2 is a side elevational view taken on line 2—2 of Figure 1, and showing one of the devices embodying the present invention;

Figure 3 is a perspective view of the device of Figure 1 with the parts shown in the position occupied by them in the initial stages of assembly of the device with a messenger and a plurality of aerial cables.

Figure 4 shows an intermediate stage of assembly of the device of Figure 2 with the messenger and cables.

Figure 5 is a perspective view of the device of Figure 2, in the stage of complete assembly with the messenger and cables.

Figure 6 is a fragmentary, perspective view of one form of bracket for supporting a messenger on a pole.

Figure 7 is a fragmentary sectional view taken on line 7—7 of Figure 4 showing in detail one of the bushings for the aerial cables.

Figure 8 is a view taken on line 8—8 of Figure 2, and showing the latching mechanism of the device of that figure.

Figure 9 is a fragmentary view of a modified form of the upper ends of the side members of the device of Figures 2 to 5 and a modified form of bushing; and Figure 10 is a side elevational view of a modified form of aerial cable supporting and spacing device embodying the present invention.

Figure 1 shows poles 1 which may be spaced several hundred feet apart and which have brackets 2 affixed thereto in any suitable manner, which brackets carry thereon a steel cable or messenger 3. Any suitable means may be used to secure the messenger to the brackets. Aerial cables 4 are disposed below messenger 3 and are supported and spaced by the devices indicated at 5.

It will be understood that the messenger 3 has sufficient tensile strength to support not only its own weight between poles 1 even though they may be several hundred feet apart, but also the weight of several aerial cables over that span and including the cable supporting and spacing means.

The device for supporting and spacing the aerial cables which is indicated at 5 in Figure 1 is shown in detail in Figures 2 to 8 inclusive. This device 5 comprises two side members 6 and 7 and an intermediate member 8. Each of these members has a thin, wide body and surfaces positioned in opposed pairs or sets on the inner or opposed edges of the members to seat bushing members and confine cables. As shown, bosses which project from the opposite sides of the bosses of the members and are perpendicular thereto extend the seating surfaces to points beyond the sides of the members. The side members 6 and 7 have hook shaped free ends or portions 9a and 9b to extend over the top of the messenger 3. At least one of said ends has an arcuate surface of sufficient length to extend over a messenger 3 and to suspend the device therefrom. The side member 6 comprises a relatively thin body 10 provided with two substantially semi-cylindrical bosses 11 on its inner edge and extending at right angles to the body. Similarly, the side member 7 has a corresponding body 10a and bosses 11a. Also similarly, the intermediate member 8 has a corresponding body 12 and bosses 11b. Reinforcing ribs 15 disposed along the bodies 10 and 11 of the side members serve to strengthen those members.

The lower end portions of side members 6 and 7, remote from upper end portions 9a and 9b, are connected as by pivots 16 to the adjacent end portions of intermediate member 8. It will be noted that these pivots, which may be made of any suitable material including metal, are spaced outside of the field between the cables, that is, these pivots are farther apart than the length of a direct line between the pair of adjacent cables.

The members 6, 7 and 8 are preferably composed of light weight material which has good electric insulating characteristics and adequate strength to withstand not only the stresses imposed thereon by the cables, but also those caused by weather conditions including ice and wind storms.

The supporting and spacing devices of this invention may be made of many different materials inculding synthetic resins, particularly acrylic resins. "Plexiglas" and "Lucite" are illustrative of materials which are quite suitable for the purpose.

The device 5 is provided with means for additionally insulating the cables and also for fitting the device to support and space cables of different diameters. The means shown for that purpose comprises pairs or sets of split bushing members which have outer surfaces shaped to engage the seating surfaces of the members. The bushing members illustrated are generally semicylindrical and are large enough to cover the inner and end surfaces of the bosses. These bushing members should have good electrical insulating properties and should be resilient and deformable when clamped about the cables. Any material having these properties may be used as bushing material, but suitable rubber compositions are preferred. The bushing members 20 are positioned in bosses 11, 11a and 11b. Preferably means is provided for securing the bushing members in the bosses. Means suitable for this purpose is shown in Figure 7. There the bushing member 20 is provided with thin flanges 21 at its ends which have apertures 22 to receive pins 23 formed integrally with a boss. These pins retain the bushing members in assembled relation with the bosses.

The end portions 9a of side member 6 has a boss 30 provided with an arcuate surface which, as shown, is approximately 260° in circumferential length and which is provided with a bushing member 31 of a size sufficient to cover the inner surface of boss 30 with flanges 32 at each end to lie on opposite ends of boss 30 and be secured in place after the manner shown in Figure 7, that is, by having apertures in the flanges which receive integral pins projecting from portion 9a. Portion 9b of side member 7 has a boss 35 which as shown is arc-shaped and is approximately 100° in circumferential length. This boss 35 is provided with a bushing member 36 which covers boss 35 and has flanges 37 which are secured against opposite ends of boss 35 by pins after the manner shown in Figure 7.

It will be understood that when device 5 is to be assembled with a messenger and three aerial cables, the portion 9a of side member 6 may be placed above the messenger with bushing member 31 extending over and being supported by the messenger. This projection of part 9a and its arcuate surface extends far enough over the messenger to retain the device thereon, even in its extended position which is shown in Figure 3. With the device so supported, by messenger 3, the upper aerial cable 4a may be placed in, and will be supported by, the bushing member 20 in the upper boss of side 6 since that bushing member extends beyond a vertical line passing through the messenger 3 and cable 4a. Then lower cable 4b may be laid in upper bushing member 20 of intermediate member 8, which may then be pivoted about its pivot pin 16 to bring cable 4b into the lower bushing member 20 on side member 6 as is better shown in Figure 4. The third cable 4c is thereupon placed in the other bushing member 20 of the other boss of member 8, as is shown in Figure 4, whereupon side member 7 may be pivoted about its pivot pin 16, with the bushing members 20 in bosses 11a being brought into contact with cables 4c and 4a and portion 9b overlapping messenger 3 and the bushing member in boss 35 coming into engagement with messenger 3. When the device 5 has been thus wrapped around the messenger and cables, the pairs or sets of adjacent bushing members will surround and grippingly engage the messenger and the cables. Since it is desirable that the device 5 should remain in fixed position on the messenger, the pair or set of bushing members 31 and 36 should have an inside diameter, when brought into position around the messenger, which is slightly less than the outside diameter of the messenger. Similarly each pair or set of bushing members 20 should have an inside diameter slightly less than the outside diameter of the cables so that when the bushing members 31 and 36 grippingly engage the messenger, each pair or set of bushing members 20 will confine and grippingly engage the cables and be deformed thereby.

The manner of mounting the bushing members, that is, by use of the pins and apertures, makes it possible readily to assemble and disassemble the bushing members with the bosses of the device, and thus to provide the device with bushing members at the factory which will be retained in place during shipment and handling and which may be readily replaced by bushing members of sizes suitable for use with different diameters.

The device 5 is provided with means for latchingly connecting or holding the parts in the assembled position shown in Figures 1, 2 and 5. While any suitable means may be used for this purpose, a preferred form is illustrated in some detail in Figures 2, 5 and 8. There portion 9a of side member 6 may be considered as a male part and portion 9b as the cooperating female part. Portion 9a has diverging side surfaces 40 which intersect transverse surfaces 41, thereby forming a wedge-shaped enlargement 42. The interposed surfaces of portion 9b are correspondingly shaped to provide a recess for that enlargement, as is better shown in Figure 8. When portion 9a is moved into the space between the spaced parts of portion 9b, the wedge-shaped enlargement 42 will be held against withdrawal, but when it is desired to open up the device 5, this may be done by the simple expedient of spreading the parts of 9b apart far enough to permit withdrawal of the wedge-shaped enlargement 42.

In Figure 9 is shown a modified form of bushing for the messenger. This bushing 50 is in the form of a split cylinder 51 with lips 52 projecting from alongside of the split. This bushing may be attached to portion 9a of device 5 after the manner shown in Figure 7. When portion 9a of side 6 is positioned above a messenger and is lowered so as to move the lips 52 down on opposite sides of the messenger and to bring the latter into the opening in the bushing, the bushing will assist in retaining the device on the messenger.

While it is important to employ cable spacers between poles 1 it is also important to space the cables near the poles because wind may cause the cables to engage the pole and thus be brought closer to or into engagement with each other.

By providing brackets 2 with slots in which device 5 may be placed for attachment to messenger 3, all such relative movement of the cables near the poles is avoided.

Figure 10 shows another form of device embodying the present invention. In this modification, side members 60 and 70 are pivotally connected together in their upper end portions as by pivots 61 and are latchingly connected together at their lower ends as by latch 62 and catch 63. Intermediate member 80 is positioned between, is engageable with, and is supported by, the side members. Each of the members is provided with bosses which may be provided with bushing members (not shown) similar to those described above in connection with Figures 1 to 8. Near their upper ends, side members 60 and 70 are provided with substantially semi-cylindrical bosses to surround, grip and be supported by, a messenger. Each of the side members is provided with circumferentially short bosses 65 which may be quite similar and which are approximately 90° in circumferential extent. The intermediate member 80 is provided with bosses which have sufficient circumferential length to cooperate with the bosses 65 and surround three aerial cables. The upper pair of bosses 65 cooperate with a substantially semi-cylindrical boss 66 of the intermediate member completely to surround the upper aerial cable while each of the lower bosses 67 of the intermediate member 80 is long enough circumferentially, when cooperating with the adjacent boss 65, substantially to surround a lower cable.

The manner of assembling the device of Figure 10 with a messenger and three cables will doubtless be obvious from the drawings and the foregoing description but, succinctly described, it may be assembled as follows. Since side members 70 extend beyond the vertical line through messenger 3, as is indicated by dotted line 68, members 70 may be placed on top of the messenger while said member 60 is spaced apart a short distance from member 70 and the members are unlatched at their bottom. The intermediate member 80 may be brought into contact with the undersides of the three cables and placed on side member 70. Thereupon, side member 60 may be swung into place, as shown in Figure 9 with the latch being brought into catch engaging position. When the parts are so latched the side members grip the intermediate member and hold it in assembled position and the bushing members grip the messenger and cables.

It will be noted that the spacing devices above described economize in the vertical space occupied by the cables. The cables are positioned at the apices of an equilateral triangle with one apex being disposed vertically below the messenger and the other apices being disposed on a horizontal line and approximately equidistant from the messenger. This arrangement of messenger and cables is compact and utilizes horizontal space to provide increased head room below the cables, a factor which is quite important in some installations.

It is to be noted that in assembling the devices of Figures 2 to 6 embodying this invention with a messenger and aerial cables, the workman does not remove or even loosen any parts. He simply places the device on the messenger, which supports it, and then wraps the parts of the device around the cables and latches the ends together with the bushing members being clamped around the messenger and cables. Thus there are no parts to be removed or replaced and the entire operation can be performed by a workman wearing gloves, or in fact by mechanical means traveling on the messenger.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A device for supporting and spacing electrical cables comprising two side members and an intermediate member composed of electrical insulating material, means pivotally connecting the ends of said intermediate member to an end of each of the side members, means detachably connecting together the free ends of said side members, the free end of at least one of said side members being hook shaped and provided with a surface of sufficient length to extend over a messenger and to suspend the device therefrom, each of said members having at least one arcuate surface on one edge disposed to cooperate with a corresponding surface on one of the other two members to surround and position an aerial cable therebetween, said side members diverging downwardly and forming a triangular space therebetween when the said hook-shaped free end of one of the side members is supported by a messenger and the free ends are connected together.

2. A device for supporting and spacing electrical cables comprising two side members and an intermediate member composed of electrical insulating material, means pivotally connecting the ends of said intermediate member to an end of each of the side members, means detachably connecting together the free ends of said side members, the free end of at least one of said side members being hook shaped and provided with a surface of sufficient length to extend over a messenger and to suspend the device therefrom, the free ends of said members being shaped substantially to surround a messenger when assembled therewith and connected together, each of said members having at least one arcuate surface on one edge disposed to cooperate with a corresponding surface on one of the other two members to surround and position an aerial cable therebetween, said side members diverging downwardly and forming a triangular space therebetween when the hook shaped free end of one of the side members is supported by a messenger and the free ends of both side members are connected together.

3. A device for supporting and spacing electrical cables comprising two side members and an intermediate member composed of electrical insulating material, means pivotally connecting the ends of said intermediate member to an end of each of the side members, means detachably connecting together the free ends of said side member, the free end of at least one of said side members being hook shaped and provided with a surface of sufficient length to extend over a messenger and to suspend the device therefrom, each of said members having at least one substantially semi-cylindrical surface on one edge disposed to cooperate with a corresponding surface on one of the other two members, bushing means engaging said arcuate surfaces to surround and position an axial cable between said surfaces, said side members diverging downwardly and forming a triangular space therebetween when the said hook-shaped free ends of one of the side members is supported by a messenger and the free ends are connected together.

4. A device for supporting and spacing electrical cables comprising three members composed of electrical insulating material, means pivotally connecting the ends of one member to an end of each of the other members, means detachably connecting together the free ends of said other members, at least one of said free ends being hook shaped and provided with a surface of sufficient length to extend over a messenger and to suspend the device therefrom, each of said members having at least one arcuate surface on one edge disposed to cooperate with a corresponding surface on one of the other two members to surround and position an aerial cable therebetween, said members forming a triangular space therebetween when the said hook-shaped free end of one of the said members is supported by a messenger and the said free ends are connected together.

5. A device for supporting and spacing electrical cables comprising two side members and an intermediate member composed of electrical insulating material, means pivotally connecting the ends of said intermediate member to an end of each of the side members, means detachably connecting together the free ends of said side member, the free end of at least one of said side members being hook shaped and provided with a surface of sufficient length to extend over a messenger and to suspend the device therefrom, each of said members having two arcuate surfaces on one edge disposed to cooperate with corresponding surfaces on the other members to surround and position aerial cables therebetween, said side members diverging downwardly and forming with the intermediate member a triangular space therebetween when the said hook-shaped free end of one of the side members is supported by a messenger and the free ends are connected together.

6. A device for supporting and spacing electrical cables comprising two side members and an intermediate member composed of electrical insulating material, means pivotally connecting the ends of said intermediate member to an end of each of the side members, means detachably connecting together the free ends of said side member, the free end of at least one of said side members being hook shaped and provided with a surface of sufficient length to extend over a messenger and to suspend the device therefrom, each of said members having two substantially semi-cylindrical surfaces of one edge disposed to cooperate with corresponding surfaces on the other members to surround aerial cables therebetween, and bushings engaging each pair of said cooperating surfaces and surrounding the aerial cables therebetween, said side members diverging downwardly and forming with the intermediate member a triangular space therebetween when the said hook-shaped free end of one of the side members is supported by a messenger and the free ends are connected together.

7. A device for supporting and spacing electrical cables comprising two side members and an intermediate member composed of electrical insulating material, means pivotally connecting the ends of said intermediate member to an end of each of the side members, means detachably connecting together the free ends of said side member, the free end of at least one of said side members being hook shaped and provided with a surface of sufficient length to extend over a messenger and to suspend the device therefrom, each of said members having two arcuate surfaces on one edge disposed to cooperate with corresponding surfaces on the other members to surround and position aerial cables therebetween, said intermediate member being substantially horizontal and forming with the side members a triangular space therebetween when the said hook-shaped free end of one of the side members is supported by a messenger and the free ends are connected together.

8. A device for supporting and spacing electrical cables comprising first and second side members and an intermediate member composed of electrical insulating material, means pivotally connecting the ends of said intermediate member to an end of each of the side members, the free end of the first side member being hook shaped and provided with a surface of sufficient length to extend over a messenger and to suspend the device therefrom, the free end of the second side member being hook shaped and detachably connectible to the free ends of the first side member, each of said members having a plurality of arcuate surfaces on one edge disposed to cooperate with corresponding surfaces on the other two members to surround and position aerial cables therebetween, said members enclosing a triangular space therebetween when the said hook-shaped ends of the side members are connected together and the device is supported by a messenger.

9. A device for supporting and spacing electrical cables comprising two side members and an intermediate member composed of electrical insulating material, means pivotally connecting the ends of said intermediate member to an end of each of the side members, one side member having a hook shaped free end provided with a surface of sufficient length to extend over and part way around a messenger and to suspend the device therefrom, and the other side member having a free end releasably securable to said free end of the first said side member, each of said members having at least one arcuate surface on one edge disposed to cooperate with a corresponding surface on one of the other two members to surround and position an aerial cable therebetween, said side members diverging downwardly and forming a triangular space therebetween when the free ends of the side members are secured together and said hook shaped free end of one member is supported by a messenger and the free ends are connected together.

10. A device for supporting and spacing electrical cables comprising two side members and an intermediate member composed of electrical insulating material, means pivotally connecting the ends of said intermediate member to an end of each of the side members, each side member having a hook-shaped free end provided with a surface of sufficient length to extend over a messenger and to position the device in suspension from the messenger, each of said members having two spaced apart arcuate surfaces on one edge disposed to cooperate with corresponding surfaces on the other two members, the free end of one side member being bifurcated to receive the free end of the other side member, said member having latching engagement when fitted in the other, said side members diverging downwardly when the free ends of the side members surround a messenger and are latched together and forming a triangle space, the cooperating pairs of arcuate surfaces serving to position aerial cables at the apices of an equilateral triangle having two base angles positioned substantially horizontally.

11. A device for supporting and spacing electrical cables comprising two side members and an intermediate member composed of electrical insulating material, means pivotally connecting the ends of said intermediate member to an end of each of the side members, each side member having a hook-shaped free end provided with a surface of sufficient length to extend over a messenger and to suspend the device from the messenger, each of said members having two spaced apart arcuate surfaces on one edge disposed to cooperate with corresponding surfaces on the other two members, split bushings attached to the members and bearing on said arcuate surfaces with each pair of bushings serving to surround and clamp an aerial cable therebetween, the free end of one side member being bifurcated to receive the free end of the other side member, said member having latching engagement when so interfitted, said side members diverging downwardly when the free ends of the side members surround a messenger and are latched together and forming a triangle space, the cooperating pairs of arcuate surfaces serving to position aerial cables at the apices of an equilateral triangle having two base angles positioned substantially horizontally.

12. A device for supporting and spacing electrical cables comprising members composed of electrical insulating material and pivotally connected together end to end, means detachably connecting together the free ends of said members, at least one of said members being provided with a supporting surface of sufficient length to extend over a messenger and to suspend the device therefrom, each of said members having at least two arcuate surfaces on one edge disposed to cooperate with corresponding surfaces on another member to surround and position an aerial cable therebetween, said members defining a triangular space therebetween when the said supporting arcuate surface extends over a messenger and the free ends are connected together.

13. A device for supporting and spacing electrical cables which comprises members composed of electrical insulating material and including two members having ends pivotally connected together and free ends, means detachably connecting said free ends together, the pivoted ends of said members having device-supporting surfaces of sufficient length substantially to surround a messenger and to position the device in suspension from the messenger, said members defining a triangular space for aerial cables when the said supporting surfaces rest on a messenger and the device is suspended therefrom and the free ends are connected together, a third member maintained in said triangular space by the pivoted members when their free ends are connected together, each of said members having at least one arcuate surface on one edge disposed to cooperate with a corresponding surface on an opposed member to surround and position an aerial cable therebetween.

14. A device for supporting and spacing electrical cables which comprises members composed of electrical insulating material and having ends pivotally connected together and free ends to be detachably connected together, one of said members having a hook-shaped portion provided with a device-supporting surface of sufficient length to extend over a messenger and to position the device in suspension from the messenger, each of said members having at least two arcuate surfaces on one edge disposed to cooperate with corresponding surfaces on an opposed member to surround and position aerial cables therebetween, said members defining a triangular space for aerial cables when the said supporting surface rests on a messenger and the device is suspended therefrom and the said free ends are connected together.

References Cited in the file of this patent

UNITED STATES PATENTS 2,820,083    Hendrix  ---------------  Jan. 14, 1958

FOREIGN PATENTS 722,084    Great Britain  -----------  Jan. 19, 1955
768,339    Great Britain  -----------  Feb. 13, 1957

OTHER REFERENCES

Publication: "Roeclamp," Electrical Engineering, June 1958, page 10A.